W. E. TURNER.
AUTOMATIC LIQUID WEIGHER.
APPLICATION FILED MAR. 17, 1919.

1,329,151.

Patented Jan. 27, 1920.

Witness
N. L. Rogers

Inventor
Walter E. Turner,
By Howard P. Smith
His Attorney

UNITED STATES PATENT OFFICE.

WALTER E. TURNER, OF PIQUA, OHIO.

AUTOMATIC LIQUID-WEIGHER.

1,329,151.                    Specification of Letters Patent.    Patented Jan. 27, 1920.

Application filed March 17, 1919. Serial No. 283,052.

*To all whom it may concern:*

Be it known that I, WALTER E. TURNER, a citizen of the United States, residing at Piqua, in the county of Miami and State of Ohio, have invented certain new and useful Improvements in Automatic Liquid-Weighers, of which the following is a specification.

The principal object of this invention is to provide an improvement in the automatic liquid weigher shown and described in my application, Serial No. 275,559, filed February 7th, 1919, and reference will be made thereto for the general principles of the device.

My improvement consists in a buoyant valve that is employed in place of the siphon for emptying a bucket that has been filled. Among the advantages to be derived from the improvement, are those of simplicity and efficiency. Other important and incidental advantages will be brought out in the following specification, and particularly set forth in the subjoined claims.

Figure 1:
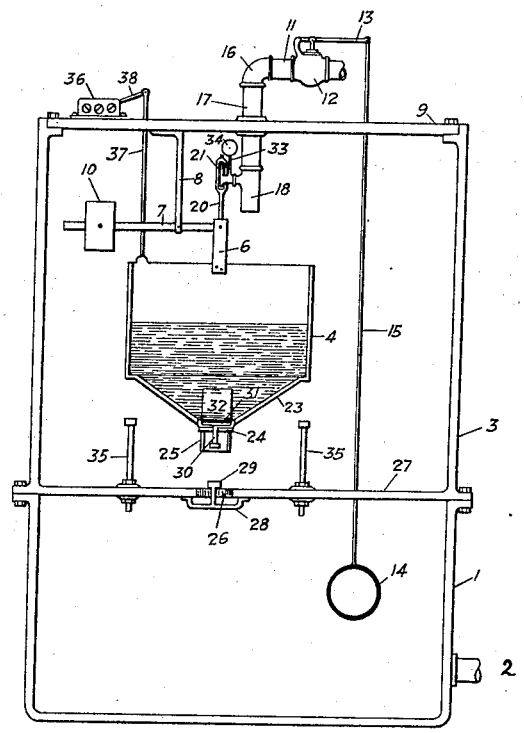
Figure 2:
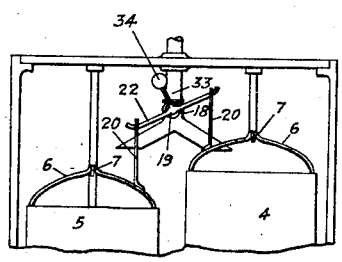
Figure 3:
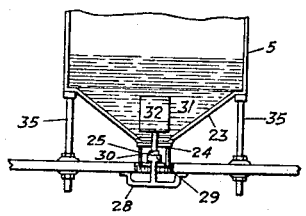

The preferred form of embodiment of my invention is illustrated in the accompanying drawings, of which Figure 1 is a side elevational view of the interior of my improved liquid weighing device, showing one weighing bucket in its uppermost position. Fig. 2 is an end view of said device, showing the means connected to the weighing buckets for operating the cut-off valve. And Fig. 3 is a partial side elevational view of my liquid weigher, showing a weighing bucket in its lowermost position.

Throughout the specification and drawings, similar reference characters denote corresponding parts.

In a detailed description of the invention, the numeral 1 designates a liquid container that is preferably rectangular in cross section. At one end, and a short distance above its bottom, the said container has the usual outlet tube 2 for the liquid within it.

Suitably mounted upon the container 1 is a supporting frame 3 for the automatic weighing mechanism now to be described. As has been stated in the above mentioned application, the automatic weighing mechanism comprises two weighing buckets 4 and 5 which are vertically movable, side by side, within the inclosing frame 3, as shown in Fig. 2. Each of said buckets is provided with a bail 6 that is pivotally secured, at its upturned central portion, to one end of a lever 7. The latter, in turn, is pivotally secured, near its front end, to the downwardly extending portion of an angle support 8 that is firmly attached to the top plate 9 of the frame 3. Longitudinally adjustable on the outer end of the lever 7 is a weight 10 for a purpose to be hereinafter described.

The following means are employed for filling the buckets 4 and 5, and for automatically changing the flow of liquid from one bucket that has been filled, to the other bucket that has been emptied, irrespective of the position of the latter. Leading from a suitable source of liquid supply (not shown) is a pipe 11 containing a shut-off valve 12 operated by a lever 13 that is connected to a float 14 within the liquid in the container 1, by a rod 15. When the liquid within the container 1 rises to a predetermined level, the float 14 will be raised to shut off the flow of liquid through the pipe 11. When the valve 12 permits it to flow through the latter, the liquid will pass through a bend 16 and vertical pipe 17 into an inverted-Y shaped delivery tube 18, the open end of one branch of which is disposed above one bucket, and the open end of the other branch of which is disposed above the other bucket.

Movable in the upper end of the inverted-Y shaped tube 18, is a rotary valve 19, described in the above mentioned application, and adapted to alternately register with the outlet branches of said tube, whereby, when the liquid is flowing through one of said branches to fill a weighing bucket, it will be restrained from entering the other bucket. While a rotary valve is shown for alternately changing this flow of liquid from one bucket to the other, any other form of valve for accomplishing this purpose may be employed without departing from the spirit of the invention.

The valve 19 is operated automatically by the following mechanism. Secured to, and projecting upwardly from, each bail 6, is a rod 20 that terminates at its upper end in a loop 21. Connected to the valve 19, for the purpose of turning it to send the liquid through one or the other branch of the tube 18, is a lever arm 22. One end of the latter extends through the looped end of one rod 20, while its other end extends through the looped end of the other rod 20. Each end of said lever arm 22 is so set within the looped end of its respective rod 20 that, when a bucket is filled with sufficient liquid to overbalance its respective weight 10 and starts to descend, it will turn the valve 19 to a position to direct the flow of liquid into the other bucket that has been emptied.

My improved means for automatically emptying a bucket that has been filled, will now be described. Each bucket is preferably provided with a downwardly and inwardly tapering bottom 23 in which is fixed a valve seat 24 through which the liquid may pass into a downwardly-extending, tubular neck portion 25. On its downward movement, the latter is adapted to enter a hole 26 provided in a partition plate 27 at the bottom of the frame 3, to discharge liquid from the descending bucket into the container 1.

Secured to the partition plate 27, below the hole 26, is a supporting member 28, from which there projects upwardly through said hole to a point a short distance above it, a stop 29. On the downward movement of a bucket, this stop 29 is adapted to be engaged by the stem 30 of a valve 31 adapted to fit tightly upon the seat 24 and supporting a hollow metal float 32. When the bucket is in its uppermost position for filling, as shown in Fig. 1, the weight of the incoming water presses the valve 31 firmly against its seat 24, to prevent any of said liquid from leaving the bucket. After a bucket has been filled, however, it will overbalance the weight 10 on the outer end of the lever 7, and descend to the position shown in Fig. 3. During its descending movement, the valve stem 30 will engage the stop 29, lifting the valve 31 from its seat 24 during a further downward movement to permit the liquid from the bucket to rush through said seat and neck portion 25 into the container 1 below. After sufficient liquid is discharged from the bucket to permit the weight 10 to lift it, the float 32, being lighter than the liquid still in the bucket, will hold the valve 30 above its seat 24 until all the liquid has been discharged, whereupon the valve will descend to its seat by gravity, and thereafter will be firmly held thereon by the pressure of the incoming liquid that is to fill it again. It is thus seen that the buoyant valve 31 uncovers the discharge opening in the bucket during its descending movement, and holds it open until the bucket is emptied, being then pressed against its seat by gravity, and held firmly thereon by the incoming liquid when the bucket is again being filled.

It will be seen that before a bucket has been emptied, it will be drawn upwardly by its respective weight, since the downward pressure of the latter will overbalance the bucket before much liquid has been drawn from it. But when this occurs, the valve 19 will not be actuated, since the end of the lever 22 that has been drawn down, will be at the top of the loop in its respective rod 20 which must move upwardly to a point where the bottom of the loop engages the lever end. However, this will not occur until the other bucket has been filled, at which time the looped end of its respective rod 20 will draw the other end of the lever 22 downwardly, to turn the valve a sufficient distance to direct the flow of supply liquid into the bucket that has been completely emptied. And when the container 1 has been filled with liquid to a desired level, the flow thereof to either bucket will be cut off by the float 20.

To the middle portion of the lever arm 22 there is secured an upwardly projecting element 33 that carries a ball 34 which prevents the valve 19 from remaining in any other than either of its extreme positions.

Referring to Fig. 3, it will be seen that a pair of adjustable stops 35 are secured to the partition plate 27 to assist the stop 29 in supporting a bucket in its lowermost position.

For the purpose of recording each time a weighing bucket is emptied, a register 36 is placed above it upon the top plate 9 of the frame 3. Through a rod 37 pivotally connected to an arm 38 operatively secured to said register, the latter will make a record of each time the bucket descends after being filled. Accordingly, by adjusting the weight 10 on the outer end of the lever 7, to hold up the bucket until it has been filled with a predetermined weight of liquid, it may be readily calculated how much liquid has been supplied to the container 1 during a certain period of time. Knowing the weight of this liquid, and the weight of the coal or other fuel used during that period to evaporate that liquid when it is used for forming steam, it further can be accurately determined how many pounds of liquid will be evaporated by one pound of the brand of coal used.

I do not wish to be limited to the details of construction and arrangement herein shown and described, and any changes or modifications may be made therein within the scope of the subjoined claims.

Having described my invention, I claim:

1. In a device of the type described, the combination with a vertically movable liquid receptacle, means for holding the latter in an elevated position until it is filled with liquid to a predetermined weight, a valve seat in the bottom of said receptacle, a valve normally in position on said seat to hold the liquid in said receptacle, a container to receive said liquid from said receptacle, a device adapted to engage the valve on the downward movement of the receptacle, to lift said valve from its seat to permit the receptacle to discharge its liquid into the container, and automatic means controlled by the liquid in the receptacle for holding said valve above its seat until all the liquid has been discharged from said receptacle.

2. In a device of the type described, the combination with a vertically movable liquid receptacle, means for holding the latter in an elevated position until it is filled with liquid to a predetermined weight, a valve seat in the bottom of said receptacle, a valve normally in position on said seat to hold the liquid in said receptacle, a container to receive said liquid from said receptacle, a device adapted to engage the valve on the downward movement of the receptacle, to lift said valve from its seat to permit the receptacle to discharge its liquid into the container, and a float secured to said valve to hold the latter above its seat until all the liquid has been discharged from said receptacle.

3. In a device of the type described, the combination with a vertically movable bucket, a lever to the inner end of which said bucket is secured, an adjustable weight on the outer end of said lever, adapted to be overbalanced when the bucket is filled with a definite quantity of liquid, to permit the bucket to descend, a valve seat provided in the bottom of said bucket, through which said liquid is adapted to pass, a valve normally in position on said seat to hold the liquid in said bucket, a downwardly projecting stem on said valve, a stop adapted to be engaged by the valve stem during the descending movement of said bucket, to lift said valve above its seat to permit said bucket to discharge its liquid, and automatic means controlled by the liquid in the receptacle and secured to said valve to hold the latter above its seat until all the liquid has been discharged from said bucket.

4. In a device of the type described, the combination with a vertically movable bucket, a lever to the inner end of which said bucket is secured, an adjustable weight on the outer end of said lever, adapted to be overbalanced when the bucket is filled with a definite quantity of liquid, to permit the bucket to descend, a container below said bucket, a valve seat provided in the bottom of the latter, through which said liquid is adapted to pass into the container, a valve normally in position on said seat to hold the liquid in said bucket, a downwardly projecting stem on said valve, a stop member adapted to be engaged by the valve stem during the descending movement of said bucket, to lift said valve from its seat to permit said bucket to discharge its liquid into the container, and a float carried by said valve to hold the latter above its seat until all the liquid has been discharged from said bucket.

In testimony whereof I have hereunto set my hand this 15th day of March, 1919.

WALTER E. TURNER.

Witness:
HOWARD S. SMITH.